United States Patent
Croak et al.

(10) Patent No.: US 8,098,803 B1
(45) Date of Patent: Jan. 17, 2012

(54) METHOD AND APPARATUS FOR CALL GAPPING OF WHOLESALE CUSTOMER TRAFFIC IN A COMMUNICATION NETWORK

(75) Inventors: Marian Croak, Fair Haven, NJ (US);
Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1357 days.

(21) Appl. No.: 11/234,918

(22) Filed: Sep. 26, 2005

(51) Int. Cl.
*H04M 15/00* (2006.01)

(52) U.S. Cl. ............ 379/112.07; 379/111; 379/112.04; 379/112.06; 379/121.01

(58) Field of Classification Search ............ 379/100.03, 379/100.05, 100.06, 111, 112.01, 112.03, 379/112.04, 112.06, 114.01, 201.02, 207.02
See application file for complete search history.

(56) References Cited

U.S. PATENT DOCUMENTS

| | | | |
|---|---|---|---|
| 6,289,010 B1 * | 9/2001 | Voit et al. | 370/352 |
| 6,292,481 B1 * | 9/2001 | Voit et al. | 370/352 |
| 6,295,292 B1 * | 9/2001 | Voit et al. | 370/352 |
| 6,556,659 B1 * | 4/2003 | Bowman-Amuah | 379/9.04 |
| 2005/0044237 A1 * | 2/2005 | Sitaraman et al. | 709/227 |
| 2005/0260971 A1 * | 11/2005 | DeLoach et al. | 455/406 |
| 2006/0173777 A1 * | 8/2006 | Torres et al. | 705/40 |
| 2006/0251226 A1 * | 11/2006 | Hogan et al. | 379/114.15 |

* cited by examiner

*Primary Examiner* — Binh Tieu

(57) ABSTRACT

A method and apparatus for enabling wholesale network service providers to selectively block calls from wholesale customers who are exceeding their traffic projections based on pre-arranged agreements. The present method also enables wholesale network service providers to notify their wholesale customers that the subscribed traffic projections, such as call minute usage, begins to approach their maximum established volume. When the maximum established volume is exceeded by the wholesale customer, the present method provides parameters for adjusting the degree to which calls from the providers will be blocked, either gracefully by blocking calls partially or completely by blocking all incoming calls.

20 Claims, 4 Drawing Sheets

200

METHOD AND APPARATUS FOR CALL GAPPING OF WHOLESALE CUSTOMER TRAFFIC IN A COMMUNICATION NETWORK

The present invention relates generally to communication networks and, more particularly, to a method and apparatus for call gapping of wholesale customer traffic in communications networks, e.g., packet networks such as Voice over Internet Protocol (VoIP) networks.

BACKGROUND OF THE INVENTION

Packet network service provider, e.g., a VoIP a network service provider will sometimes enable the use of its network by other service providers, e.g., wholesale customers, via wholesale partnerships. Wholesales arrangements typically involve discounted rates to be offered for specified volumes of traffic, such as a specified amount of call minute usage, which will be carried over the wholesale service provider's network. The wholesale service provider supporting wholesale traffic originating from wholesale customer's network must engineer their networks with enough capacity to support the negotiated call minute usage. Traffic exceeding these projections can lead to service disruptions and impact traffic of other customers supported by the wholesale service provider's network.

Therefore, a need exists for a method and apparatus for call gapping of wholesale customer traffic in a packet network, e.g., a VoIP network.

SUMMARY OF THE INVENTION

In one embodiment, the present invention enables wholesale network service providers to selectively block calls from wholesale customers who are exceeding their traffic projections based on pre-arranged agreements. The present invention also enables wholesale network service providers to notify their wholesale customers that the subscribed traffic projections, such as call minute usage, begins to approach their maximum established volume. When the maximum established volume is exceeded by the wholesale customer, the present invention provides parameters for adjusting the degree to which calls from the providers will be blocked, either gracefully by blocking calls partially or completely by blocking all incoming calls, depending on business arrangements and established Service Level Agreements (SLA). An SLA is a set of performance objectives reached by consensus between the user and the provider of network services that specifies a variety of network service performance guarantees.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
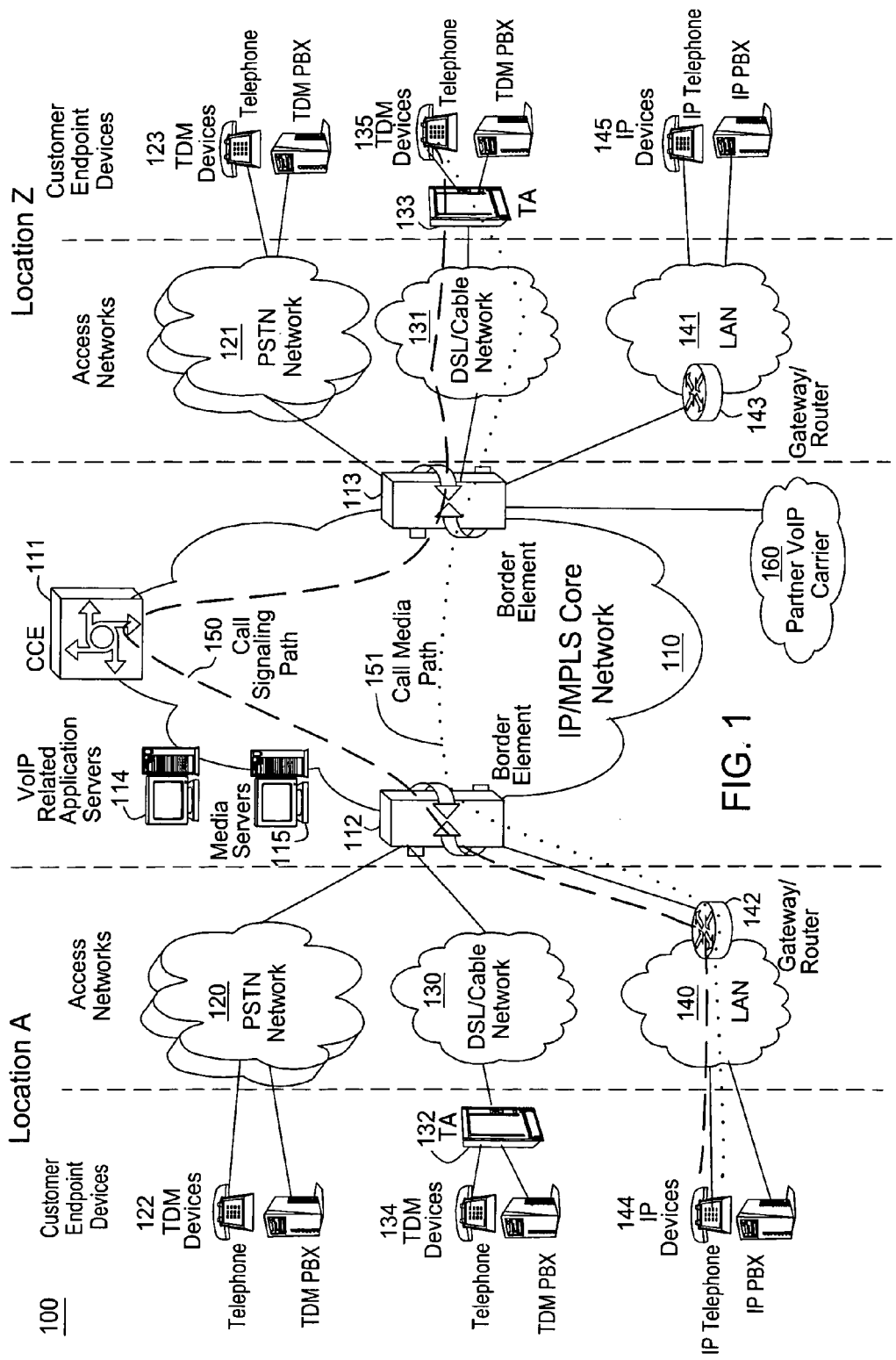
FIG. 1 illustrates an exemplary Voice over Internet Protocol (VoIP) network related to the present invention.

To better understand the present invention, FIG. 1 illustrates an example network 100, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet network service provider, e.g., a VoIP a network service provider will sometimes enable the use of its network by other service providers, wholesale customers, via wholesale partnerships. Wholesales arrangements typically involve discounted rates to be offered for specified volumes of traffic, such as a specified amount of call minute usage, which will be carried over the wholesale service provider's network. The wholesale service provider supporting wholesale traffic originating from wholesale customer's network must engineer their networks with enough capacity to support the negotiated call minute usage. Traffic exceeding these projections can lead to service disruptions and impact traffic of other customers supported by the wholesale service provider's network.

To address this criticality, the present invention enables wholesale network service providers to selectively block calls from wholesale customers who are exceeding their traffic projections based on pre-arranged agreements. The present invention also enables wholesale network service providers to notify their wholesale customers that the subscribed traffic projections, such as call minute usage, begins to approach their maximum established volume. When the maximum established volume is exceeded by the wholesale customer, the invention provides parameters for adjusting the degree to which calls from the providers will be blocked, either gracefully by blocking calls partially or completely by blocking all incoming calls, depending on business arrangements and established Service Level Agreements (SLA). An SLA is a set of performance objectives reached by consensus between the user and the provider of network services that specifies a variety of network service performance guarantees.

Figure 2:
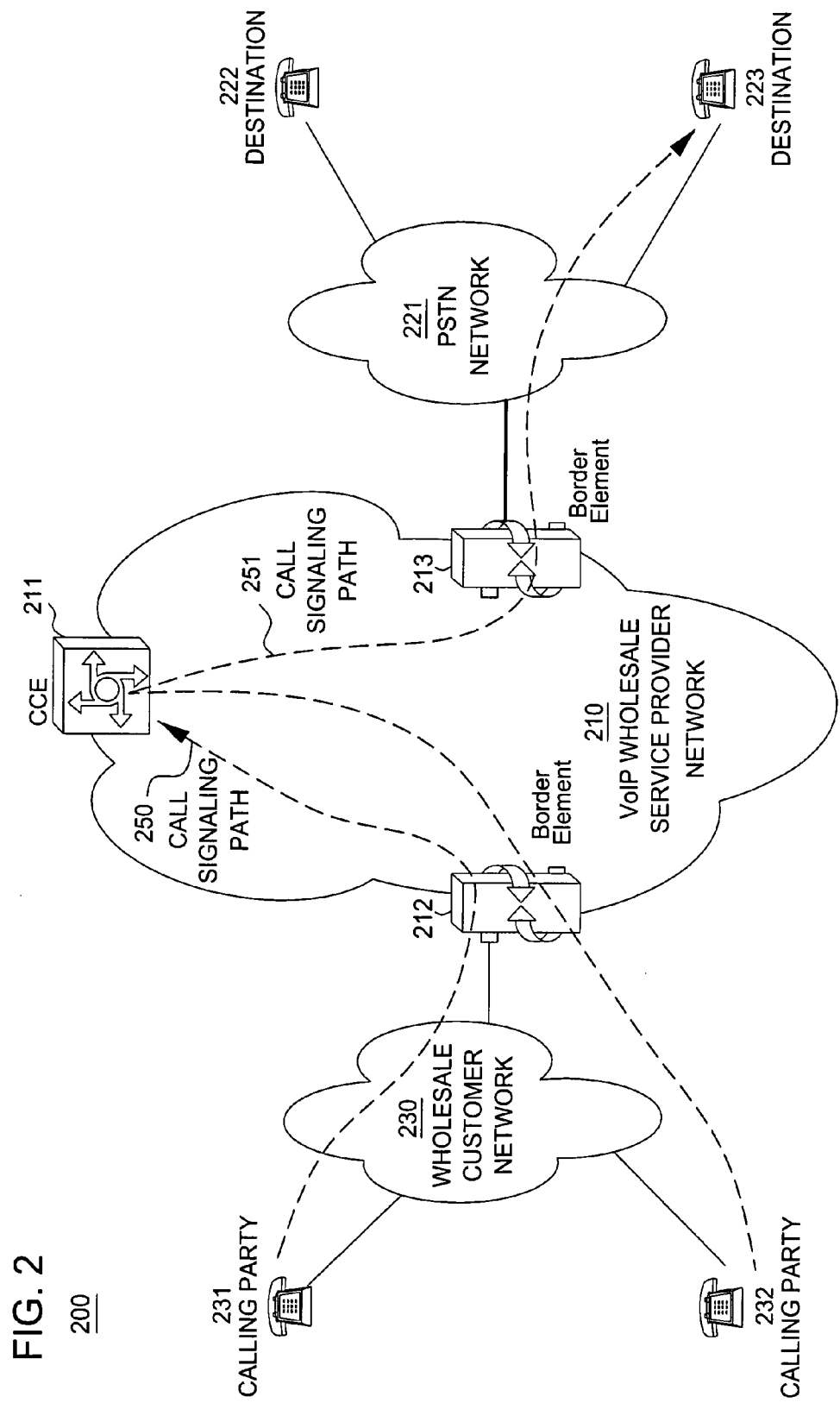
FIG. 2 illustrates an example of call gapping of wholesale customer traffic in a VoIP network of the present invention.

FIG. 2 illustrates an exemplary communication architecture 200 for call gapping of wholesale customer traffic in a packet network, e.g., a VoIP network of the present invention. In FIG. 2, a wholesale service provider owns and runs VoIP wholesale service provider network 210 and another telephone carrier owns and runs wholesale customer network 230. Wholesale customer network 230 has established an SLA to purchase a fixed number of minutes, e.g. a fixed call minute usage agreement, with VoIP wholesale service provider network 210. Note that wholesale customer network 230 can be either a PSTN network or a VoIP network interfacing with VoIP wholesale service provider network 210 via BE 212. Calling parties 231 and 232 are subscribers of wholesale customer network 230. In one embodiment of the present invention, the provider of wholesale customer network 230 has an agreement with the provider of VoIP wholesale service provider network 210 that if the established call minute usage is exceeded, all incoming call setup attempts thereafter will be blocked. Calling party 232 makes a call to destination 223 using signaling flow 251 via wholesale customer network 230, BE 212, CCE 211, BE 213, and access network 221. Specifically, CCE 211 upon receiving the call setup message from calling party 232 checks that the incoming call is from wholesale customer network 230 and the established call minute usage is not yet exceeded; therefore, CCE 211 proceeds to setup the call between calling party 232 and destination 223. Incoming calls from the wholesale customer can be identified by using the calling party's phone number, source IP address, or the information of the access trunk connecting between VoIP wholesale service provider network 210 and wholesale customer network 230. Shortly thereafter, the established call minute usage is exceeded, e.g., the number of minutes subscribed by wholesale customer network 230 with VoIP wholesale service provider network 210 has been used up and calling party 231 makes a call to destination 222. Since the call minute usage has been exceeded, VoIP wholesale service provider network 210 blocks the incoming call from calling party 231 via wholesale customer network 230 using signaling flow 250.

In another embodiment of the present invention, the provider of wholesale customer network 230 may have an agreement with the provider of VoIP wholesale service provider network 210 that if the established call minute usage threshold is exceeded, all incoming call setup attempts thereafter will be blocked at a rate of 1 out of every N calls, where N is a predefined parameter set by the provider of VoIP wholesale service provider network 210 with agreement from the provider of wholesale customer network 230. This allows that some incoming calls from wholesale customer network 230 to be allowed and completed by VoIP wholesale service provider network 210.

In addition, VoIP wholesale service provider network 210 can send an alert to wholesale customer network 230 when the established call minute usage threshold is about to be exceeded. This will allow the wholesale customer to react appropriately before the established call minute usage threshold is actually exceeded, such as by increasing the call minute usage limit through a new agreement.

Figure 3:
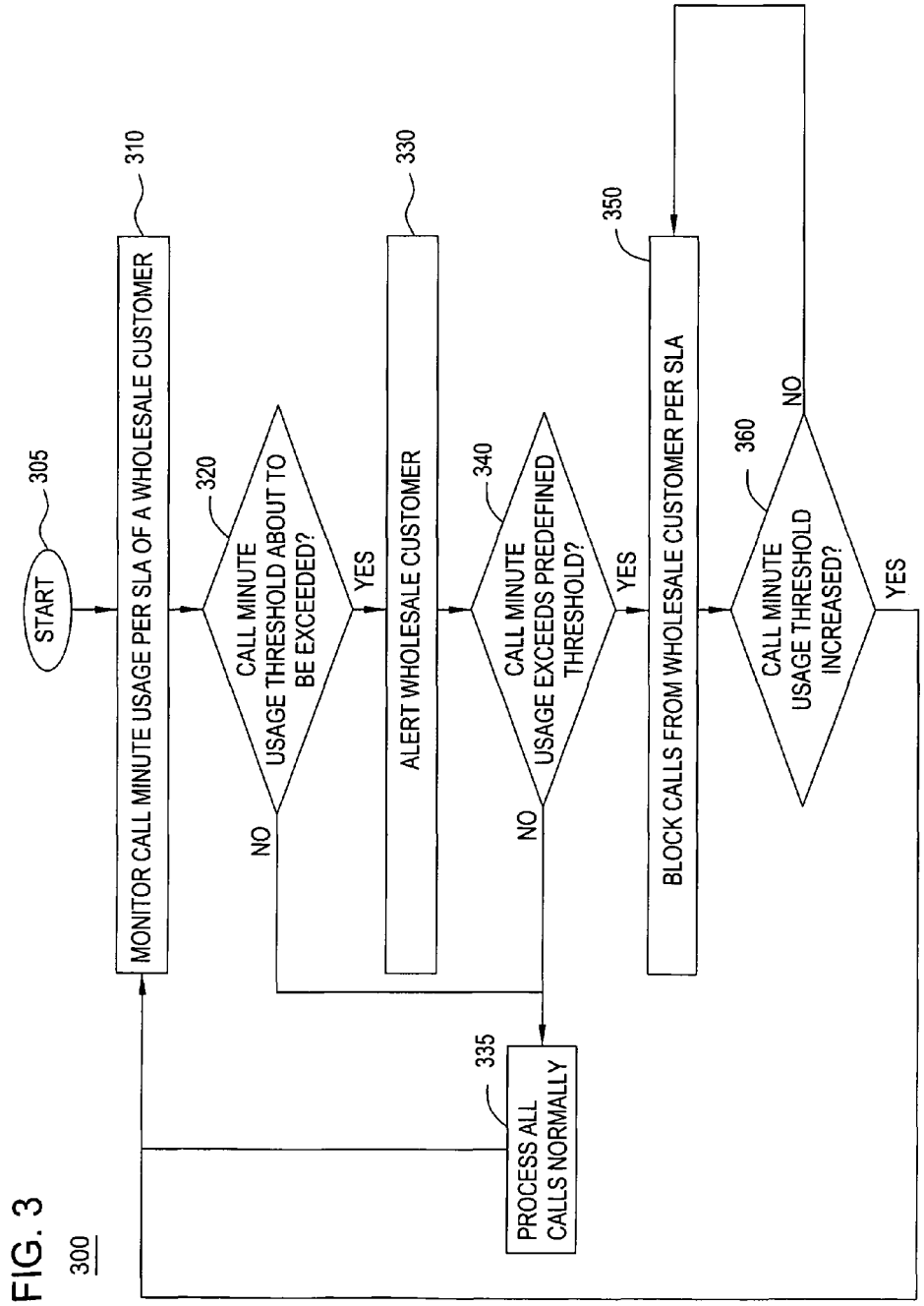
FIG. 3 illustrates a flowchart of a method for call gapping of wholesale customer traffic in a VoIP network of the present invention.

FIG. 3 illustrates a flowchart of a method 300 for call gapping of wholesale customer traffic in a packet network, e.g., a VoIP network of the present invention. Method 300 starts in step 305 and proceeds to step 310.

In step 310, the method monitors a wholesale customer's call minute usage per the established SLA. For example, call minute usage associated with subscribers of the whole sale customer network is monitored.

In step 320, the method checks if the predefined call minute usage threshold is about to be exceeded. The network provider can set an alarm target such that if the call minute usage is beyond X percent (e.g., 85%-95%) of the predefined call minute usage threshold, it will declare that the predefined call minute usage threshold is about to be exceeded, where X is a configurable parameter set by the network provider. If the predefined call minute usage threshold is about to be exceeded, the method proceeds to step 330; otherwise, the method proceeds to step 335.

In step 330, the method sends an alert to the wholesale customer to inform the customer that the agreed traffic usage projections provided has already reached X percent. This will allow the wholesale customer to react accordingly. For example, the wholesale network provider can offer the wholesale customer the opportunity to increase the previously established call minute usage threshold if appropriate.

In step 335, the method processes all incoming calls, such as call setup signaling messages, from the wholesale customer normally.

In step 340, the method checks if the call minute usage has already exceeded the established call minute usage threshold. If the call minute usage threshold is exceeded, the method proceeds to step 350; otherwise, the method proceeds to step 335.

In step 350, the method blocks incoming calls, such as call setup signaling messages, from wholesale customers according to the established SLA. In one embodiment of the present invention, the wholesale network provider can block all incoming calls from the wholesale customer per established SLA. In another embodiment of the present invention, the wholesale network provider can block some incoming calls, such as 1 out of every N calls, from the wholesale customer per established SLA, where N is a configurable parameter set by the wholesale network provider and agreed upon between the wholesale network provider and the wholesale customer.

In step 360, the method checks if the call minute usage threshold has been increased that may be due to other recent arrangements or agreements. If the call minute usage threshold has been increased, the method proceeds back to step 310; otherwise, the method proceeds back to step 350.

Figure 4:
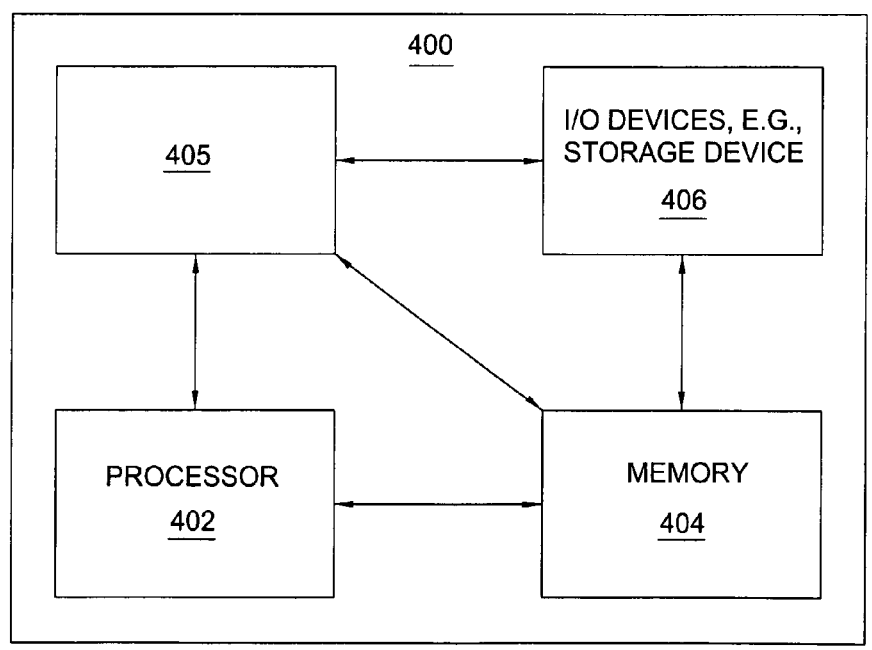
FIG. 4 illustrates a high level block diagram of a general purpose computer suitable for use in performing the functions described herein.

FIG. 4 depicts a high level block diagram 400 of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a call gapping of wholesale customer traffic module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present call gapping of wholesale customer traffic module or process 405 can be loaded into memory 404 and executed by processor 402 to implement the functions as discussed above. As such, the present call gapping of wholesale customer traffic process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for call gapping of wholesale customer traffic in a communication network, comprising:
   monitoring a call minute usage of a wholesale customer, wherein the wholesale customer operates a wholesale customer network;
   sending an alert to warn the wholesale customer if the call minute usage approaches a predefined call minute usage threshold;
   receiving incoming calls;
   checking if the call minute usage threshold has been exceeded by the wholesale customer network upon receiving each one of the incoming calls; and
   call blocking incoming calls originated by the wholesale customer network if the call minute usage exceeds the predefined call minute usage threshold.

2. The method of claim 1, wherein the communication network is an internet protocol network.

3. The method of claim 1, wherein the predefined call minute usage threshold is based on a service level agreement established between a provider of the communication network and the wholesale customer.

4. The method of claim 1, wherein the call blocking comprises:
   blocking the incoming calls originated by the wholesale customer network partially.

5. The method of claim 1, wherein the incoming calls originated by the wholesale customer network are identified based on information related to an access trunk connecting between the communication network and the wholesale customer network.

6. The method of claim 1, wherein the call blocking is enabled by a call control element.

7. The method of claim 1, wherein the call minute usage of the wholesale customer is monitored by a call control element.

8. The method of claim 1, wherein the alert is sent when the call minute usage is within a percentage of the predefined call minute usage threshold.

9. The method of claim 1, further comprising:
   disabling the call blocking if the predefined call minute usage threshold is increased to a higher limit.

10. A non-transitory computer-readable medium having stored thereon a plurality of instructions, the plurality of instructions including instructions which, when executed by a processor, cause the processor to perform a method for call gapping of wholesale customer traffic in a communication network, comprising:
    monitoring a call minute usage of a wholesale customer, wherein the wholesale customer operates a wholesale customer network;
    sending an alert to warn the wholesale customer if the call minute usage approaches a predefined call minute usage threshold;
    receiving incoming calls;
    checking if the call minute usage threshold has been exceeded by the wholesale customer network upon receiving each one of the incoming calls; and
    call blocking incoming calls originated by the wholesale customer network if the call minute usage exceeds the predefined call minute usage threshold.

11. The computer-readable medium of claim 10, wherein the communication network is an Internet protocol network.

12. The computer-readable medium of claim 10, wherein the predefined call minute usage threshold is based on a service level agreement established between a provider of the communication network and the wholesale customer.

13. The computer-readable medium of claim 10, wherein the call blocking comprises:
    blocking the incoming calls originated by the wholesale customer network partially.

14. The computer-readable medium of claim 10, wherein the incoming calls originated by the wholesale customer network are identified based on information related to an access trunk connecting between the communication network and the wholesale customer network.

15. The computer-readable medium of claim 10, wherein the call blocking is enabled by a call control element.

16. The computer-readable medium of claim 10, wherein the call minute usage of the wholesale customer is monitored by a call control element.

17. The computer-readable medium of claim 10, wherein the alert is sent when the call minute usage is within a percentage of the predefined call minute usage threshold.

18. The computer-readable medium of claim 10, further comprising:
    disabling the call blocking if the predefined call minute usage threshold is increased to a higher limit.

19. An apparatus for call gapping of wholesale customer traffic in a communication network, comprising:
    means for monitoring a call minute usage of a wholesale customer, wherein the wholesale customer operates a wholesale customer network;
    means for sending an alert to warn the wholesale customer if the call minute usage approaches a predefined call minute usage threshold;
    means for receiving incoming calls;
    means for checking if the call minute usage threshold has been exceeded by the wholesale customer network upon receiving each one of the incoming calls; and
    means for call blocking incoming calls originated by the wholesale customer network if the call minute usage exceeds the predefined call minute usage threshold.

20. The apparatus of claim 19, wherein the communication network is an internet protocol network.

* * * * *